(12) United States Patent
Lee (10) Patent No.: US 9,669,761 B2
(45) Date of Patent: Jun. 6, 2017

(54) AROUND VIEW MONITORING APPARATUS AND METHOD THEREOF

(71) Applicant: HYUNDAI MOBIS Co., Ltd., Yongin-si, Gyeonggi-do (KR)

(72) Inventor: Sung Joo Lee, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 293 days.

(21) Appl. No.: 14/515,583

(22) Filed: Oct. 16, 2014

(65) Prior Publication Data

US 2015/0360612 A1 Dec. 17, 2015

(30) Foreign Application Priority Data

Jun. 13, 2014 (KR) ........................ 10-2014-0072289

(51) Int. Cl.
*B60R 1/00* (2006.01)
*H04N 5/57* (2006.01)

(52) U.S. Cl.
CPC .......... *B60R 1/00* (2013.01); *B60R 2300/105* (2013.01); *B60R 2300/30* (2013.01); *B60R 2300/303* (2013.01); *H04N 5/57* (2013.01)

(58) Field of Classification Search
CPC ...................................................... B60R 1/00
USPC ........................................................ 348/148
See application file for complete search history.

(56) References Cited

U.S. PATENT DOCUMENTS

2004/0061774 A1* 4/2004 Wachtel ................ G03B 19/00
348/36

2005/0025313 A1* 2/2005 Wachtel ................ G06T 1/0007
380/54
2008/0226165 A1* 9/2008 Wada ...................... G06T 5/009
382/167
2009/0179916 A1* 7/2009 Williams .............. G06T 7/0018
345/629
2009/0237269 A1* 9/2009 Okugi ....................... B60R 1/00
340/901

(Continued)

FOREIGN PATENT DOCUMENTS

CN 101236603 A 8/2008
CN 102273201 A 12/2011

(Continued)

OTHER PUBLICATIONS

Feb. 21, 2017, Chinese Office Action for related CN application No. 201410641588.9.

*Primary Examiner* — Dave Czekaj
*Assistant Examiner* — Shanika Brumfield
(74) *Attorney, Agent, or Firm* — Paratus Law Group, PLLC (57) ABSTRACT

The present invention provides an around view monitoring (AVM) apparatus, including: a plurality of cameras which is mounted on a vehicle; a video composing unit which receives a plurality of videos from the plurality of cameras and composes the plurality of videos to generate an around view video; a brightness correcting unit which receives the around view video and corrects and outputs the brightness of the around view video based on an average brightness value and a variance of the brightness values for every region which is included in the around view video; and a video display unit which displays the around view video whose brightness is corrected.

17 Claims, 9 Drawing Sheets

(56) References Cited

U.S. PATENT DOCUMENTS

| | | | |
|---|---|---|---|
| 2012/0026333 A1* | 2/2012 | Okuyama | B60R 1/00 348/148 |
| 2014/0341467 A1* | 11/2014 | Seo | G06T 5/008 382/167 |
| 2015/0049950 A1* | 2/2015 | Jang | G06T 5/50 382/190 |

FOREIGN PATENT DOCUMENTS

| | | | | |
|---|---|---|---|---|
| JP | 11102430 A | * | 4/1999 | |
| JP | 2007323587 A | * | 12/2007 | |
| JP | 2011-250376 A | | 12/2011 | |
| KR | 10-2011-0088680 A | | 8/2011 | |
| KR | 10-2013-0028230 | | 3/2013 | |
| KR | 20130040595 A | * | 4/2013 | |
| KR | 10-2013-0125111 A | | 11/2013 | |
| SE | WO 9619893 A1 | * | 6/1996 | H04N 5/2258 |
| SE | WO 9700573 A2 | * | 1/1997 | H04N 3/1593 |

\* cited by examiner

AROUND VIEW MONITORING APPARATUS AND METHOD THEREOF

CROSS-REFERENCE TO RELATED APPLICATIONS

The present application claims priority to Korean Patent Application Number 10-2014-0072289 filed Jun. 13, 2014, the entire contents of which application is incorporated herein for all purposes by this reference.

TECHNICAL FIELD

The present invention relates to an around view monitoring (AVM) apparatus which displays a video around a vehicle and a method thereof, and more particularly, to an AVM apparatus which corrects a brightness in an around view video and a method thereof.

BACKGROUND

Recently, in accordance with improvement and multi-functionalization of a vehicle, an around view monitoring (hereinafter, abbreviated as an AVM) system is mounted in the vehicle.

The AVM system is a system which acquires videos around the vehicle through cameras which are mounted in four directions of the vehicle and allows a driver to check surroundings of the vehicle through a display device which is mounted inside the vehicle without intentionally looking back or checking the surroundings at the time of parking the vehicle. Further the AVM system composes the videos of the surroundings to provide an around view as if it is watched from a top of the vehicle. The driver may determine a situation around the vehicle at a glance to safely park the vehicle or drive the vehicle on a narrow road using the AVM system.

However, the AVM system of the related art composes a plurality of images received from a plurality of cameras to display an around view so that difference can be sensed when a difference between brightnesses of images is generated.

Patent Document: Korean Unexamined Patent Application Publication No. 10-2013-0028230

SUMMARY

The present invention has been made in an effort to provide an AVM apparatus which corrects a brightness of an around view video and a method thereof.

Objects of the present invention are not limited to the above-mentioned objects, and other objects, which are not mentioned above, can be clearly understood by those skilled in the art from the following descriptions.

An exemplary embodiment of the present invention provides an around view monitoring (AVM) apparatus, including: a plurality of cameras which is mounted on a vehicle; a video composing unit which receives a plurality of videos from the plurality of cameras and composes the plurality of videos to generate an around view video; a brightness correcting unit which receives the around view video and corrects and corrects the brightness of the around view video based on an average brightness value and a variation in the brightnesses for every region which is included in the around view video and outputs the around view video whose brightness is corrected; and a video display unit which displays the around view video whose brightness is corrected.

Other detailed matters of the embodiments are included in the detailed description and the drawings.

According to the exemplary embodiments of the present invention, there are one or more advantages as follows.

First, the brightness is corrected based on the around view video so that the sense of difference in the brightness may be rapidly processed.

Second, even when a shadow or an obstacle is included in the around view vide, the sense of difference in the brightness may be minimized.

Third, when a mounted camera is changed, there is no need to adjust a common imaging range.

Fourth, a quality of the sensitivity may be improved by minimizing the sense of difference in the brightness of a composite video.

The effects of the present invention are not limited to the aforementioned effects, and other effects, which are not mentioned above, will be apparently understood by a person skilled in the art from the recitations of the claims.

DETAILED DESCRIPTION OF THE INVENTION

Advantages and characteristics of the present invention, and a method of achieving the advantages and characteristics will be clear by referring to exemplary embodiments described below in detail together with the accompanying drawings. However, the present invention is not limited to exemplary embodiment disclosed herein but will be implemented in various forms. The exemplary embodiments are provided to enable the present invention to be completely disclosed and the scope of the present invention to be easily understood by those skilled in the art. Therefore, the present invention will be defined only by the scope of the appended claims. Like reference numerals indicate like elements throughout the specification.

A term including an ordinal number such as first or second which is used in the present specification may be used to explain components but the components are not limited by the terms. The above terms are used only for distinguishing one component from the other component.

In the following description, a left side of the vehicle indicates a left side of a driving direction of the vehicle, that is, a driver seat side and a right side of the vehicle indicates a right side of the driving direction of the vehicle, that is, a front passenger seat side.

Figure 1:
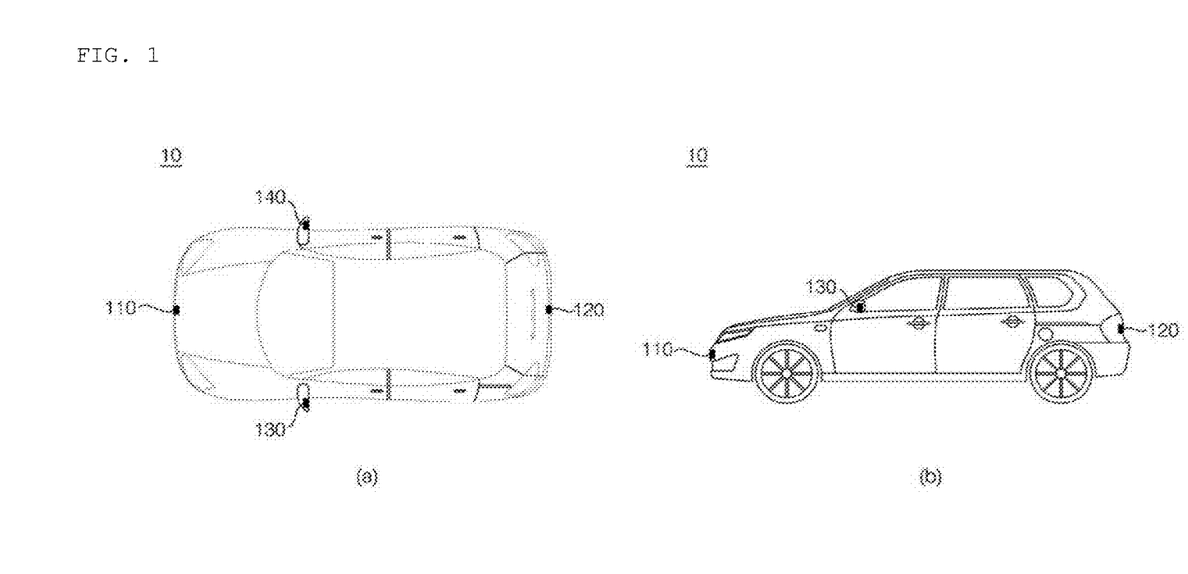
FIG. 1 is a view schematically illustrating a vehicle which includes an AVM apparatus according to an exemplary embodiment of the present invention.

FIG. 1 is a view schematically illustrating a vehicle which includes an AVM apparatus according to an exemplary embodiment of the present invention.

Referring to FIG. 1, an AVM apparatus 100 which is mounted in a vehicle 10 includes a plurality of cameras 110, 120, 130, and 140. Here, the plurality of cameras 110, 120, 130, and 140 may be four cameras so as to acquire videos of a front side, a rear side, a left side, and a right side of the vehicle 10. The plurality of cameras 110, 120, 130, and 140 is provided at the outside of the vehicle 10 to input videos around the vehicle 10. Here, the plurality of cameras 110, 120, 130, and 140 is desirably a super wide angle camera having an angle of view of 180 degrees or larger.

In the meantime, it is assumed that the number of the plurality of cameras 110, 120, 130, and 140 is four in this specification, but the present invention is not limited thereto.

For example, the first camera 110 may be installed at the front side of the vehicle 10 to input a video at the front side of the vehicle 10. The first camera 110 may be mounted on a portion of a front bumper.

The second camera 120 is installed at the rear side of the vehicle 10 to input a video at the rear side of the vehicle 10. The fourth camera 140 may be installed on a portion of a rear bumper, that is, an upper side or a lower side of a license plate.

The third camera 130 is installed on the left side of the vehicle 10 to input a video around the left side of the vehicle 10. The third camera 130 may be installed on a portion of a left side mirror of the vehicle 10 or a portion of a front fender.

The fourth camera 140 is installed on the right side of the vehicle 10 to input a video around the right side of the vehicle 10. The fourth camera 140 may be installed on a portion of a right side mirror of the vehicle 10 or a portion of the front fender.

Figure 2:
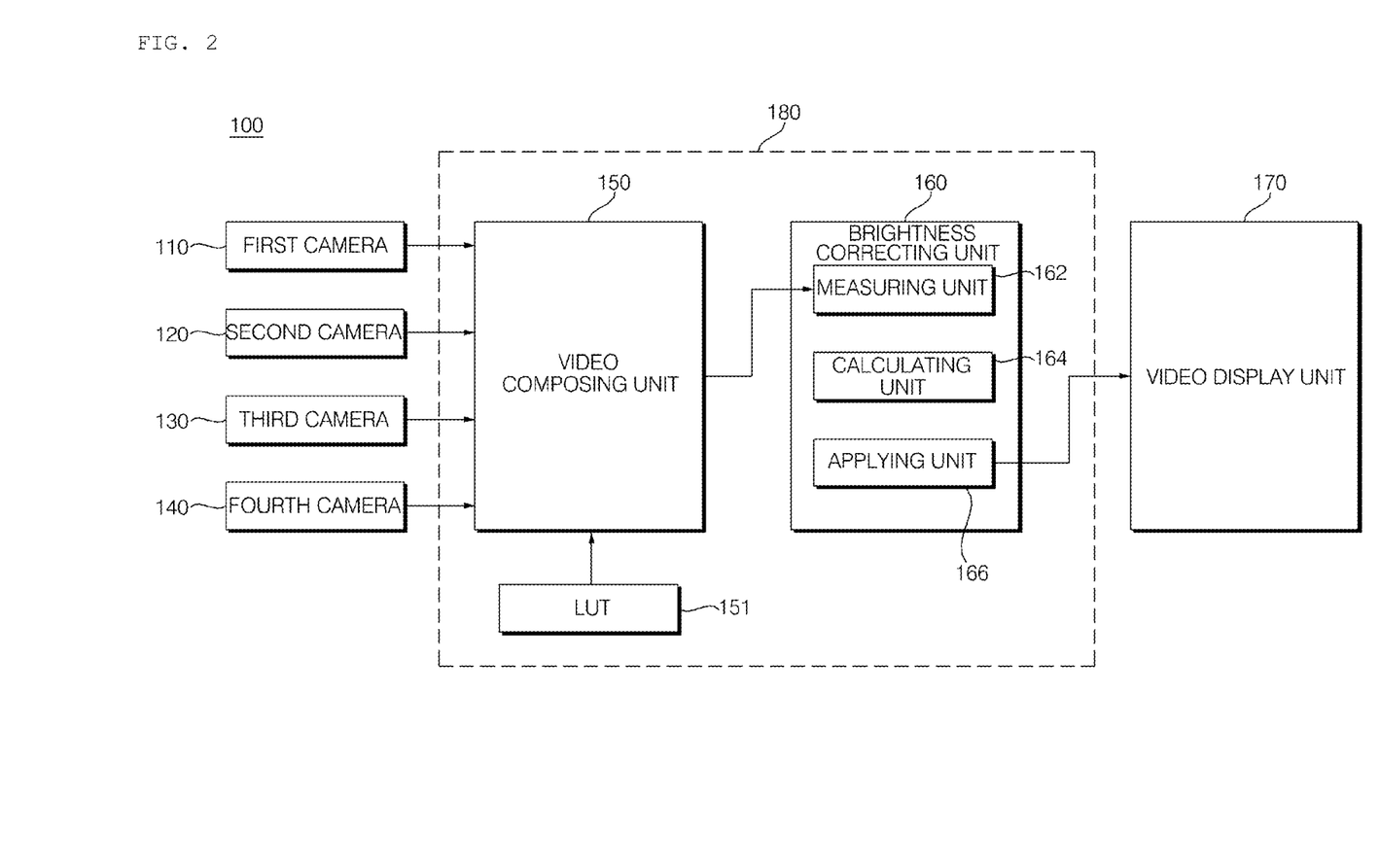
FIG. 2 is a block diagram of an AVM apparatus according to an exemplary embodiment of the present invention.

FIG. 2 is a block diagram of an AVM apparatus according to an exemplary embodiment of the present invention.

Referring to FIG. 2, the AVM apparatus 100 according to an exemplary embodiment of the present invention includes a plurality of cameras 110, 120, 130, and 140, a processor 180, and a video display unit 170.

Here, the processor 180 includes a video composing unit 150 and a brightness correcting unit 160.

The first camera 110 acquires a first video. The first camera 110 outputs the acquired first video to the video composing unit 150. Here, the first video is a video which captures surroundings at the front side of the vehicle. The second camera 120 acquires a second video.

The second camera 120 acquires a second video. The second camera 120 outputs the acquired second video to the video composing unit 150. Here, the second video is a video which captures surroundings at a rear side of the vehicle.

The third camera 130 acquires a third video. The third camera 130 outputs the acquired third video to the video composing unit 150. Here, the third video is a video which captures surroundings at a left side of the vehicle.

The fourth camera 140 acquires a fourth video. The fourth camera 140 outputs the acquired fourth video to the video composing unit 150. Here, the fourth video is a video which captures surroundings at a right side of the vehicle.

The video composing unit 150 receives the first video, the second video, the third video, and the fourth video. The video composing unit 150 composes the first video, the second video, the third video, and the fourth video to generate an around view video. For example, the around view video may be a top view video. In this case, the video composing unit 150 may use a look-up table. The look-up table is a table which stores a relationship indicating that one pixel of a composite video corresponds to any pixel of four original videos (first to fourth videos).

In the meantime, the around view video may include a first channel, a second channel, a third channel, and a fourth channel. Here, the first channel is a region corresponding to the first video and corresponds to a front region of the vehicle in the around view video. The second channel is a region corresponding to the second video and corresponds to a rear region of the vehicle in the around view video. The third channel is a region corresponding to the third video and corresponds to a left side region of the vehicle in the around view video. The fourth channel is a region corresponding to the fourth video and corresponds to a right side region of the vehicle in the around view video.

The video composing unit 150 outputs the around view video to the brightness correcting unit 160.

The brightness correcting unit 160 receives the around view video. The first to fourth videos are obtained by capturing different scenes using different cameras while receiving different light so that the first to fourth videos have different brightnesses. Therefore, the around view video generated by composing the first to fourth videos has different brightnesses. The brightness correcting unit 160 corrects the brightnesses based on an average of brightnesses and a variance of the brightness values for every region which is included in the around view video.

The brightness correcting unit 160 receives and processes the around view video so that a processing time is short. Further, a common capturing range is not assumed unlike the AVM apparatus of the related art, so that there is no need to separately adjust the common capturing range of the plurality of cameras as a camera installation error or an installation specification changes.

The brightness correcting unit 160 includes a measuring unit 162, a calculating unit 164, and an applying unit 166.

The measuring unit 162 measures an average brightness value and a variance of the brightness values of an upper region of a boundary line and a lower region of the boundary line obtained by composing the plurality of videos in the around view video.

The calculating unit 164 calculates a corrected value of the around view video using the average brightness value and the variance of the brightness values using a first calculating method or a second calculating method.

In the meantime, the calculating unit 164 may calculate one corrected value for a predetermined number of frames in the around view video. The calculating unit 164 may calculate one corrected value for six frames in the around view video.

The applying unit 166 applies the calculated corrected brightness value to the around view video.

The measuring unit 162, the calculating unit 164, and the applying unit 166 will be described in detail with reference to FIGS. 4 to 8.

The brightness correcting unit 160 outputs an around view video whose brightness is corrected to the video display unit 170.

The video display unit 170 receives and displays the around view video whose brightness is corrected. The display unit 170 may include at least one display to display the around view video. In the meantime, when the around view video is displayed, various user interfaces may be provided or a touch sensor which allows touch input for the provided user interface may be provided. Further, the video display unit 170 may be an audio visual navigation (AVN) which is mounted on the vehicle.

The processor 180 controls individual modules of the AVM apparatus and performs various arithmetic operations. The processor 180 may determine whether the around view video satisfies a first condition, a second condition, and a third condition.

Figure 3:
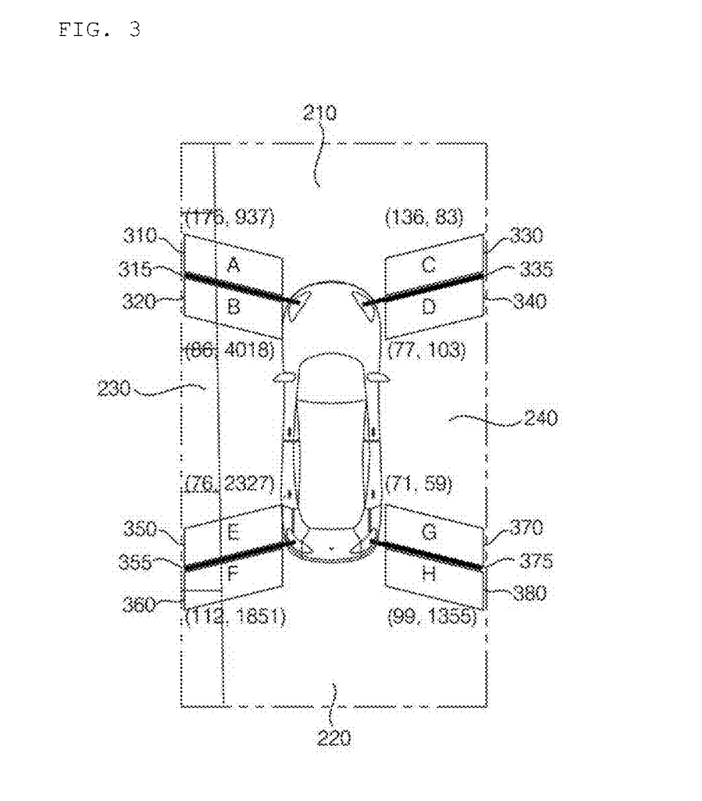
FIG. 3 is a view illustrating an operation of a measuring unit according to exemplary embodiment of the present invention.

FIG. 3 is a view illustrating an operation of a measuring unit according to the exemplary embodiment of the present invention.

Referring to FIG. 3, the measuring unit 162 measures the average brightness value and the variance of the brightness values of the around view video.

As described above, the around view video includes a first channel 210, a second channel 220, a third channel 230, and a fourth channel 240. The first channel 210 is a vehicle front video corresponding to the first video. The second channel 220 is a vehicle rear side video corresponding to the second video. The third channel 230 is a vehicle left side video corresponding to the third video. The fourth channel 340 is a vehicle right side video corresponding to the fourth video.

A first boundary line 315 is located between the first channel 210 and the third channel 230. A second boundary line 335 is located between the first channel 210 and the fourth channel 240. A third boundary line 355 is located between the second channel 220 and the third channel 230. A fourth boundary line 375 is located between the second channel 220 and the fourth channel 240.

Since the around view video is generated by composing the first video received by the first camera 110, the second video received by the second camera 120, the third video received by the third camera 130, and the fourth video received by the fourth camera 140, the first boundary line 315, the second boundary line 335, the third boundary line 355, and the fourth boundary line 375 are inevitably generated.

The measuring unit 162 measures the average brightness value and the variance of the brightness values in upper regions of the boundary lines (the first to fourth boundary lines) and in lower regions of the boundary lines (the first to fourth boundary lines) obtained by composing the plurality of videos (first to fourth videos). That is, the measuring unit 162 measures the average brightness value and a variance of the brightness values of an upper region 310 (hereinafter, referred to as an A region) of the first boundary line 315 and a lower region 320 (hereinafter, referred to as a B region) of the first boundary line 315. The measuring unit 162 measures the average brightness value and a variance of the brightness values of an upper region 330 (hereinafter, referred to as a C region) of the second boundary line 335 and a lower region 340 (hereinafter, referred to as a D region) of the second boundary line 335. The measuring unit 162 measures the average brightness value and a variance of the brightness values of an upper region 350 (hereinafter, referred to as an E region) of the third boundary line 355 and a lower region 360 (hereinafter, referred to as an F region) of the third boundary line 355. The measuring unit 162 measures the average brightness value and a variance of the brightness values of an upper region 370 (hereinafter, referred to as a G region) of the fourth boundary line 375 and a lower region 380 (hereinafter, referred to as an H region) of the fourth boundary line 375.

For example, the measuring unit 162 measures 178 nit as the average brightness value and 937 as the variance of the brightness values of the upper region 310 of the first boundary line. The measuring unit 162 measures 86 nit as the average brightness value and 4018 as the variance of the brightness values of the lower region 320 of the first boundary line. The measuring unit 162 measures 136 nit as the average brightness value and 83 as the variance of the brightness values of the upper region 330 of the second boundary line. The measuring unit 162 measures 77 nit as the average brightness value and 103 as the variance of the brightness values of the lower region 340 of the second boundary line. The measuring unit 162 measures 76 nit as the average brightness value and 2327 as the variance of the brightness values of the upper region 350 of the third boundary line. The measuring unit 162 measures 112 nit as the average brightness value and 360 as the variance of the brightness values as 1851 of the lower region 360 of the third boundary line. The measuring unit 162 measures 71 nit as the average brightness value and 59 as the variance of the brightness values of the upper region 370 of the fourth boundary line. The measuring unit 162 measures 99 nit as the average brightness value and 1355 as the variance of the brightness values of the lower region of the fourth boundary line.

FIGS. 4 to 7 are views illustrating an operation of a calculating unit according to exemplary embodiment of the present invention.

Figure 4:
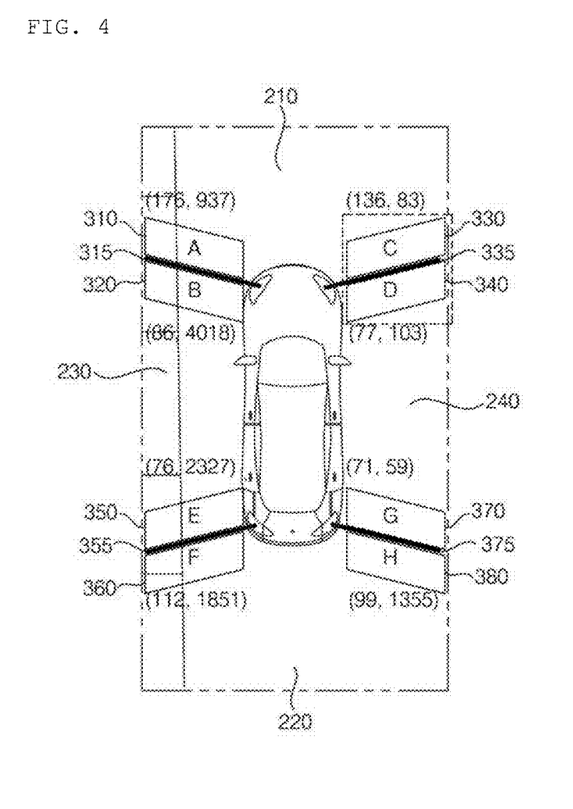
FIGS. 4 to 7 are views illustrating an operation of a calculating unit according to exemplary embodiment of the present invention.

FIG. 4 is a view illustrating an operation of calculating a corrected value by a first calculating method under a first condition.

Referring to FIG. 4, the processor 180 determines whether the around view video satisfies the first condition. Here, the first condition may be a case where a shadow having a predetermined size or an object having a predetermined size other than the corresponding vehicle is not included in the around view video. Further, the first condition may be a case where a variance of brightnesses of adjacent regions between channels is equal to or smaller than a first threshold value and a ratio of the average brightness value is equal to or smaller than a second threshold value. Here, the first threshold value is a threshold value of the variance of the brightness values and may be determined by an experiment. For example, the first threshold value is 1600. The second threshold value is a ratio obtained by dividing an average of bright brightnesses by an average of dark brightnesses and may be determined by an experiment. For example, the second threshold value is 2.

When the first condition is satisfied, the calculating unit 164 calculates the corrected value by the first calculating method. That is, the calculating unit 164 calculates the corrected value such that the averages of the brightnesses in adjacent regions are the same. The first calculating method is a method which calculates an arithmetic average value of the upper region (A region, C region, E region, or G region) and the lower region (B region, D region, F region, or H region) of the boundary line 315, 335, 355, or 375 and subtracts the average brightness value of the upper region (A region, C region, E region, or G region) or the lower region (B region, D region, F region, or H region) from the arithmetic average value to calculate the corrected value.

For example, in the around view video of FIG. 4, an average brightness value of the upper region 330 (hereinafter, C region) of the second boundary line 335 is 136 and a variance of the brightness values is 83. An average brightness value of the lower region 340 (hereinafter, D region) of the second boundary line 335 is 77 and a variance of the brightness values is 103.

The processor 180 determines whether the around view video satisfies the first condition. That is, the processor 180 determines whether a shadow having a predetermined size or an object having a predetermined size other than the corresponding vehicle is not included in the around view video.

The processor 180 determines whether the variance of the brightness values of the C region 330 and the variance of the brightness values of the D region are equal to or smaller than the first threshold value, that is, 1600. In the present exemplary embodiment, the variance of the brightness values of the C region 330 is 83 and the variance of the brightness values of the D region is 103, so that the variances of the brightnesses of the C region 330 and the D region are equal to or smaller than the first threshold value.

The processor 180 determines whether a ratio of the average brightness values is equal to or smaller than a second threshold value, that is, 2. In the present exemplary embodiment, a value obtained by dividing the average brightness value of the C region 330, 136, by the average brightness value of the D region 340, 77 is equal to or smaller than 2. Therefore, in the around view video of FIG. 4, the C region 330 and the D region 340 satisfy the first condition and the corrected value is calculated by the first calculating method.

The calculating unit 164 calculates the corrected value such that the average brightness values of the C region 330 and the D region 340 are equal to each other. That is, the calculating unit 164 calculates an arithmetic average value of the average brightness value of the C region 330, that is, 136 and the average brightness value of the D region 340, that is, 77. The calculating unit 164 subtracts the average brightness value of the C region 330 from the arithmetic average value to calculate a corrected value of the C region 330. The calculating unit 164 subtracts the average brightness value of the D region 340 from the arithmetic average value to calculate a corrected value of the D region 340.

The corrected value of the C region 330 is calculated as (136+77)/2−136=−29.5. The corrected value of the D region 340 is calculated as (136+77)/2−77=29.5.

Figure 5:
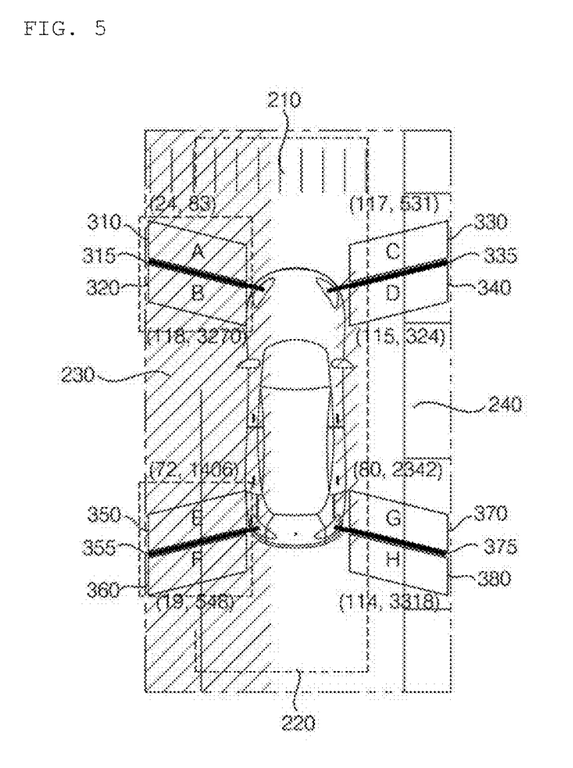

FIG. 5 is a view illustrating an operation of calculating a corrected value by a first calculating method under a second condition.

Referring to FIG. 5, the processor 180 determines whether the around view video satisfies the second condition. Here, the second condition may be a case where a shadow is included over at least one region among the first channel 210 to the fourth channel 240 and a gain of the camera corresponding to the region where the shadow is included is increased so that the region becomes bright. Further, a brightness variance of the external adjacent regions of the channels may be equal to or smaller than the first threshold value and a difference of the average brightness values of the external adjacent regions of each channel may be equal to or smaller than a third threshold value. Here, the first threshold value is the value as described above and the third threshold value is an absolute value of a difference between the average brightness values of the external adjacent regions of a predetermined channel and may be determined by an experiment. For example, the third threshold value is 60.

When the second condition is satisfied, the calculating unit 164 calculates the corrected value by the first calculating method. That is, the calculating unit 164 calculates the corrected value such that the average brightness values in adjacent regions are the same.

For example, in the around view video of FIG. 5, an average brightness value of the upper region 310 (hereinafter, A region) of the first boundary line 315 is 24 and a variance of the brightness values is 83. An average brightness value of the lower region 320 (hereinafter, B region) of the first boundary line 315 is 118 and a variance of the brightness values is 3270. An average brightness value of the upper region 350 (hereinafter, E region) of the third boundary line 355 is 72 and a variance of the brightness values is 1406. An average brightness value of the lower region 360 (hereinafter, F region) of the third boundary line 355 is 19 and a variance of the brightness values is 548.

The processor 180 determines whether the around view video satisfies the second condition. That is, the processor 180 determines whether a shadow is included over at least one region of the first channel 210 to the fourth channel 240 in the around view video so that the camera gain is increased. In the present exemplary embodiment, a shadow is included over the entire third channel 230 and the camera gain is increased.

The processor 180 determines whether the variance of the brightness values of the A region 310 and the variance of the brightness values of the F region 360 are equal to or smaller than the first threshold value, that is, 1600. In the present exemplary embodiment, the variance of the brightness values of the A region 310 is 83 and the variance of the brightness values of the F region 360 is 548, so that the variances of the brightnesses of the A region 310 and the F region 360 are equal to or smaller than the first threshold value.

Then, the processor 180 determines whether a difference between the average brightness values of the external adjacent regions of each channel is equal to or smaller than the third threshold value, that is, 60. In the present exemplary embodiment, the average brightness value of the A region 310 is 24 and the average brightness value of the F region 360 is 19 so that an absolute value of the difference between the average brightness value of the A region 310 and the average brightness value of the F region 360 is 5, which is equal to or smaller than the third threshold value, that is, 60. Therefore, in the around view video of FIG. 5, the A region 310 and the F region 360 satisfy the second condition and the corrected value is calculated by the first calculating method.

The calculating unit 164 calculates the corrected value of the B region 320 such that the average brightness values of the A region 310 and the B region 320 are equal to each other. That is, the calculating unit 164 calculates an arithmetic average of the average brightness value, 24, of the A region 310 and the average brightness value, 118, of the B region 320. The calculating unit 164 subtracts the average brightness value of the B region 320 from the arithmetic average value to calculate a corrected value of the B region 320. The corrected value of the B region 320 is calculated as (24+118)/2−118=−47.

The calculating unit 164 calculates a corrected value of the E region 350 such that the average brightness values of the E region 350 and the F region 360 are equal to each other. That is, the calculating unit 164 calculates an arithmetic average value of the average brightness value, 72, of the E region 350 and the average brightness value, 19, of the F region 360. The calculating unit 164 subtracts the average brightness value of the E region 350 from the arithmetic average value to calculate a corrected value of the E region 350. The corrected value of the E region 350 is calculated as (72+19)/2−72=−26.5.

Figure 6:
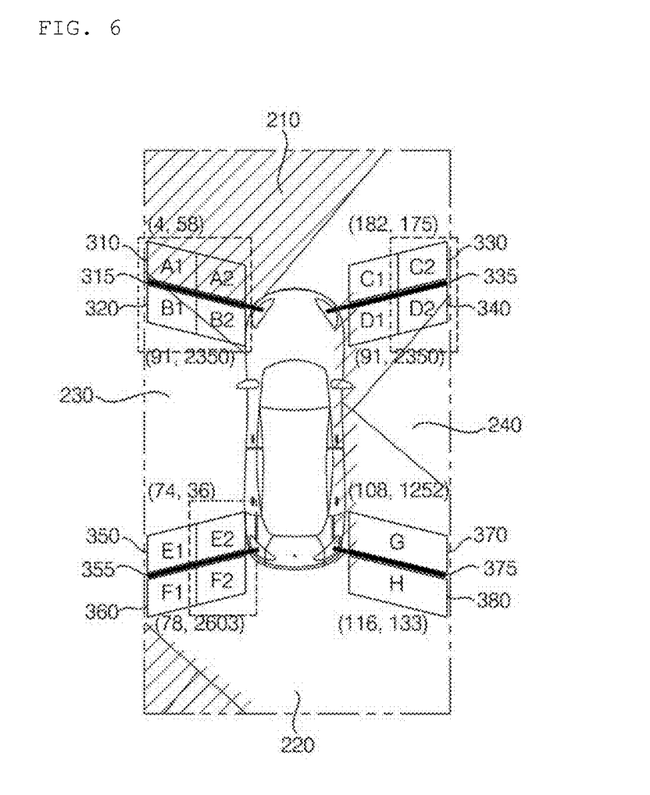

FIG. 6 is a view illustrating an operation of calculating a corrected value by the third calculating method.

Referring to FIG. 6, the processor 180 determines whether the around view video satisfies the third condition. Here, the third condition may be a case where a shadow or an object having a predetermined size other than the corresponding vehicle is included over two or more regions of the first to fourth channels 210 to 240. When the around view video satisfies the third condition, the calculating unit 164 calculates a corrected value by the second calculating method. Here, the second calculating method is a method that divides the upper region (A region, C region, E region, or G region) or the lower region (B region, D region, F region, or H region) of the boundary line 315, 335, 355, or 375 into a plurality of regions, calculates an arithmetic average value of divided regions which are symmetric to each other with respect to the boundary line 315, 335, 355, or 375, and subtracts the average brightness value of the divided regions from the arithmetic average value to calculate a corrected value.

The processor 180 divides a region ROI (region of interest) which satisfies the third condition into a plurality of sub ROIs. The calculating unit 164 calculates a corrected value between sub ROIs.

For example, shadows are located in the A region 310 and the B region 320 in the around view video of FIG. 6. The processor 180 determines that the A region 310 and the B region 320 satisfy the third condition. In this case, the processor 180 divides the A region 310 and the B region 320 into a plurality of sub ROIs. That is, the A region 310 is divided into an A1 region and an A2 region. Further, the B region 320 is divided into a B1 region and a B2 region. In this case, the processor 180 determines whether the variance of the brightness values of the A1 region and the variance of the brightness values of the B1 region are equal to or smaller than the first threshold value. Further, the processor 180 determines whether a ratio of the average brightness value of the A1 region and the average brightness value of the B1 region is equal to or smaller than the second threshold value. If the variance of the brightness values of the A1 region and the variance of the brightness values of the B1 region are equal to or smaller than the first threshold value and the ratio of the average brightness value of the A1 region and the average brightness value of the B1 region is equal to or smaller than the second threshold value, corrected values of the A1 region and the B1 region are calculated. Here, a method of calculating the corrected value is the same as the first calculating method which calculates the corrected value using the arithmetic average of the average brightness values. Similarly, corrected values of A2 and B2 regions are calculated.

If the variance of the brightness values of the A1 region and the variance of the brightness values of the B1 region are not equal to or smaller than the first threshold value or the ratio of the average brightness value of the A1 region and the average brightness value of the B1 region is not equal to or smaller than the second threshold value, the corrected values are calculated by the first calculating method. That is, the corrected values are calculated by the first calculating method, as described with reference to FIG. 4, not for the A1 region and the B1 region, but for the A region 310 and the B region 320.

In the meantime, in the present exemplary embodiment, it is assumed that the number of sub ROIs is two, but the present invention is not limited thereto.

Figure 7:
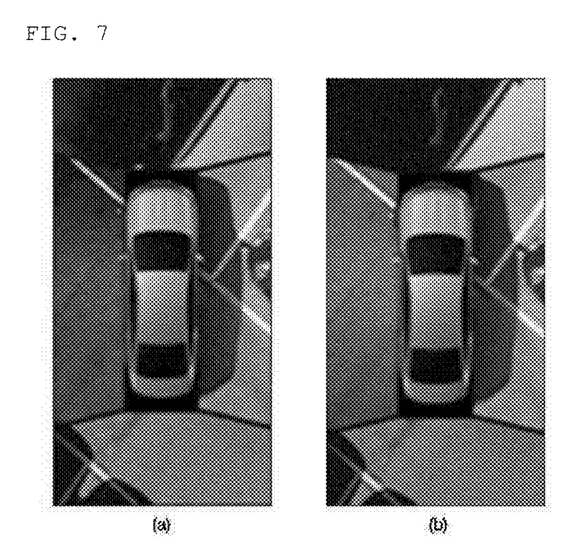

FIG. 7 is a view illustrating an around view video when the corrected value is calculated by the second calculating method according to the exemplary embodiment of the present invention.

FIG. 7A illustrates an around view video when the brightness is corrected by using only the first calculating method. FIG. 7B illustrates an around view video when the brightness is corrected by using the first calculating method and the second calculating method.

A brightness of a portion which is not required to correct a brightness is also corrected, as seen from a front left side of the vehicle, in the around view video illustrated in FIG. 7A, so that an unclear around view video is output. In contrast, a brightness of a portion which is not required to correct a brightness is not corrected, as seen from a front left side of the vehicle, in the around view video illustrated in FIG. 7B, so that a comparatively smooth around view video is output.

Figure 8:
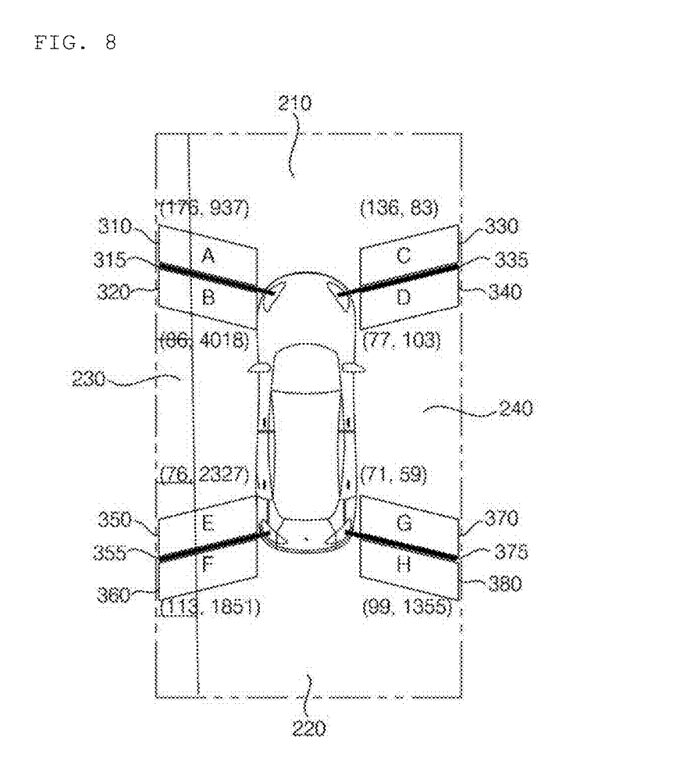
FIG. 8 is a view illustrating an operation of an applying unit according to exemplary embodiment of the present invention.

FIG. 8 is a view illustrating an operation of an applying unit according to exemplary embodiment of the present invention.

Referring to FIG. 8, the applying unit 166 applies the corrected value which is calculated by the calculating unit 164 to the around view video. The applying unit 166 accumulates a plurality of corrected values calculated by the calculating unit 164 to obtain an average value and applies the accumulated average values to the around view video. For example, the applying unit 166 calculates an accumulated average of ten corrected values in a state when ten corrected values which are sequentially calculated by the calculating unit 164 are accumulated and applies the accumulated average to the around view video. When the accumulated average value is applied, a screen flickering phenomenon caused when a corrected brightness value is sharply changed in the around view video may be prevented.

The applying unit 166 applies the corrected values by the calculating unit 164 to the first channel 210, the second channel 220, the third channel 230, and the fourth channel 240, respectively.

That is, in the first channel 210, the applying unit 166 applies a weighted mean value of the corrected value of the A region 310 and the corrected value of the C region 330 as a corrected value in accordance with an x position of the pixel, as represented by Equation 1.

$$\text{Applied corrected value} = \{(\text{width of video} - x\ \text{position}) \times \text{corrected value of } A\ \text{region} + x\ \text{position} \times \text{corrected value of } C\ \text{region}\}/\text{width of video} \quad \text{Equation 1}$$

In the second channel 220, the applying unit 166 applies a weighted mean value of the corrected value of the F region 360 and the corrected value of the H region 380 as a corrected value in accordance with an x position of the pixel, as represented by Equation 2.

$$\text{Applied corrected value} = \{(\text{width of video} - x\ \text{position}) \times \text{corrected value of } F\ \text{region} + x\ \text{position} \times \text{corrected value of } H\ \text{region}\}/\text{width of video} \quad \text{Equation 2}$$

In the third channel 230, the applying unit 166 applies a weighted mean value of the corrected value of the B region 320 and the corrected value of the E region 350 as a corrected value in accordance with a y position of the pixel, as represented by Equation 3.

$$\text{Applied corrected value} = \{(\text{side height} - y\ \text{position}) \times \text{corrected value of } B\ \text{region} + y\ \text{position} \times \text{corrected value of } E\ \text{region}\}/\text{side height} \quad \text{Equation 3}$$

In the fourth channel 240, the applying unit 166 applies a weighted mean value of the corrected value of the D region 340 and the corrected value of the G region 370 as a corrected value in accordance with a y position of the pixel, as represented by Equation 4.

$$\text{Applied corrected value} = \{(\text{side height} - y\ \text{position}) \times \text{corrected value of } D\ \text{region} + y\ \text{position} \times \text{corrected value of } G\ \text{region}\}/\text{side height} \quad \text{Equation 4}$$

Figure 9:
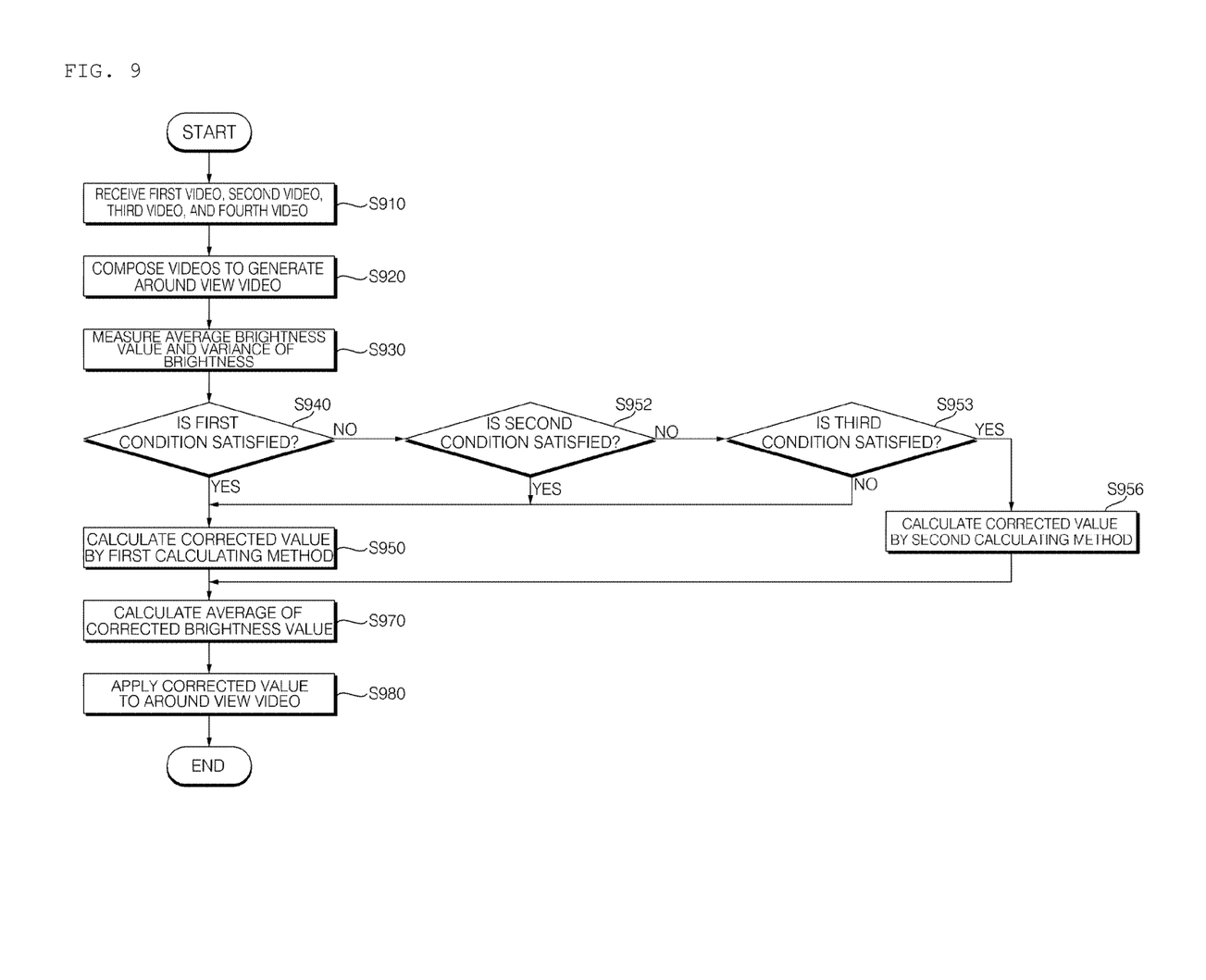
FIG. 9 is a flow chart of an operating method of an AVM apparatus according to an exemplary embodiment of the present invention.

FIG. 9 is a flow chart of an operating method of an AVM apparatus according to an exemplary embodiment of the present invention.

Referring to FIG. 9, a video composing unit 150 receives a first video from a first camera 110 in step S910. Here, the first video is a video which captures surroundings at the front side of the vehicle. The video composing unit 150 receives a second video from a second camera 120 in step S910. Here, the second video is a video which captures surroundings at a rear side of the vehicle. The video composing unit 150 receives a third video from a third camera 130 in step S910. Here, the third video is a video which captures surroundings at a left side of the vehicle. The video composing unit 150 receives a fourth video from a fourth camera 130 in step S910. Here, the fourth video is a video which captures surroundings at a right side of the vehicle.

In a state when the first video, the second video, the third video, and the fourth video are received, the video composing unit 150 composes the first video, the second video, the third video, and the fourth video to generate an around view video in step S920. In this case, the around view video may be a top view video. In this case, the video composing unit 150 may use a look-up table. The look-up table is a table which stores a relationship indicating that one pixel of a composite video corresponds to any pixel of four original videos (first to fourth videos).

In a state when the around view video is generated, the measuring unit 162 measures an average brightness value and a variance of the brightness values of an upper region of a boundary and a lower region of the boundary obtained by composing the plurality of videos in the around view video in step S930.

The around view video includes a first channel 210, a second channel 220, a third channel 230, and a fourth channel 240. The first channel 210 is a vehicle front video corresponding to the first video. The second channel 220 is a vehicle rear video corresponding to the second video. The third channel 230 is a vehicle left video corresponding to the third video. The fourth channel 340 is a vehicle right video corresponding to the fourth video.

A first boundary 315 is located between the first channel 210 and the third channel 230. A second boundary line 335 is located between the first channel 210 and the fourth channel 240. A third boundary line 355 is located between the second channel 220 and the third channel 230. A fourth boundary line 375 is located between the second channel 220 and the fourth channel 240.

Since the around view video is generated by composing the first video received by the first camera 110, the second video received by the second camera 120, the third video received by the third camera 130, and the fourth video received by the fourth camera 140, the first boundary line 315, the second boundary line 335, the third boundary line 355, and the fourth boundary line 375 are inevitably generated.

The measuring unit 162 measures the average brightness value and the variance of the brightness values in an upper region of the boundary line (the first to fourth boundary lines) and in a lower region of the boundary line (the first to fourth boundary lines) obtained by composing the plurality of videos (first to fourth videos). That is, the measuring unit 162 measures the average brightness value and a variance of the brightness values of an upper region 310 (hereinafter, referred to as an A region) of the first boundary line 315 and a lower region 320 (hereinafter, referred to as a B region) of the first boundary line 315. The measuring unit 162 measures the average brightness value and a variance of the brightness values of an upper region 330 (hereinafter, referred to as a C region) of the second boundary line 335 and a lower region 340 (hereinafter, referred to as a D region) of the second boundary line 335. The measuring unit 162 measures the average brightness value and a variance of the brightness values of an upper region 350 (hereinafter, referred to as an E region) of the third boundary line 355 and a lower region 360 (hereinafter, referred to as an F region) of the third boundary line 355. The measuring unit 162 measures the average brightness value and a variance of the brightness values of an upper region 370 (hereinafter, referred to as a G region) of the fourth boundary line 375 and a lower region 380 (hereinafter, referred to as an H region) of the fourth boundary line 375.

In a state when the average brightness value and the variance of the brightness values are measured in each region, the processor 180 determines whether each region (A region to H region) satisfies the first condition in step S940. Here, the first condition may be a case where a shadow having a predetermined size or an object having a predetermined size other than the corresponding vehicle is not included in the around view video. Further, the first condition may be a case where a variance of brightnesses of adjacent regions between channels is equal to or smaller than a first threshold value and a ratio of the average brightness value is equal to or smaller than a second threshold value. Here, the first threshold value is a threshold value of the variance of the brightness values and may be determined by an experiment. The second threshold value is a ratio obtained by dividing an average of bright brightnesses by an average of dark brightnesses and may be determined by an experiment.

When the predetermined region satisfies the first condition, the processor 180 determines whether the individual regions (A region to H region) satisfy the third condition in step S953. Here, the third condition may be a case where a shadow or an object having a predetermined size other than the corresponding vehicle is included over two or more regions of the first to fourth channels 210 to 240.

When the predetermined region satisfies the third condition, the calculating unit 164 calculates the corrected value by the second calculating method. The detailed description of calculation of the corrected value by the second calculating method is the same as described with reference to FIG. 6.

When the predetermined region does not satisfy the third condition in step S953, the calculating unit 164 calculates the corrected value of each region by the first calculating method in step S950. That is, the calculating unit 164 calculates the corrected value such that the average brightness values in adjacent regions are the same. The detailed description of the calculation of the corrected value by the first calculating method under the first condition is the same as described with reference to FIG. 4.

When the predetermined region does not satisfy the first condition in step S940, the processor 180 determines whether the individual regions (A region to H region) satisfy the second condition in step S952. Here, the second condition may be a case where a shadow is included over at least one region among the first channel 210 to the fourth channel 240 and a gain of the camera corresponding to the region where the shadow is included is increased so that the region becomes bright. Further, the second condition may be a case where a brightness variance of the external adjacent regions of the channels is equal to or smaller than the first threshold value and a difference of the average values of the brightnesses of the external adjacent regions of each channel is equal to or smaller than a third threshold value. Here, the first threshold value is the value as described above and the third threshold value is an absolute value of a difference between the average values of the brightnesses between the external adjacent regions of a predetermined channel and may be determined by an experiment.

When a predetermined region satisfies the second condition, the calculating unit 164 calculates a corrected value of each region by the first calculating method in step S950. The detailed description of the calculation of the corrected value by the first calculating method under the second condition is the same as described with reference to FIG. 5.

In a state when the corrected value is calculated by the first calculating method and the second calculating method, the applying unit 166 calculates an accumulated average value of the corrected value in step S970.

Next, the applying unit 166 applies the corrected values to the first channel 210, the second channel 220, the third channel 230, and the fourth channel 240 in step S980.

Preferred embodiments of the present invention have been illustrated and described above, but the present invention is not limited to the above-described specific embodiments, it is obvious that various modifications may be made by those skilled in the art, to which the present invention pertains without departing from the gist of the present invention, which is claimed in the claims, and such modifications should not be individually understood from the technical spirit or prospect of the present invention.

What is claimed is:

1. An around view monitoring (AVM) apparatus, comprising:
   a plurality of cameras which is mounted on a vehicle;
   a video composing unit which receives a plurality of videos from the plurality of cameras and composes the plurality of videos to generate an around view video;
   a brightness correcting unit which receives the around view video and corrects the brightness of the around view video based on an average brightness value and a variation of the brightness values for every region which is included in the around view video and outputs the around view video whose brightness is corrected; and
   a video display unit which displays the around view video whose brightness is corrected,
   wherein the brightness correcting unit includes:
   a measuring unit which measures an average brightness value and a variance of the brightness values of an upper region of a boundary and a lower region of the boundary obtained by composing the plurality of videos in the around view video;
   a calculating unit which calculates a corrected brightness value of the around view video by a first calculating method or a second calculating method, using the average brightness value and the variance of the brightness values; and
   an applying unit which applies the calculated corrected brightness value to the around view video,
   wherein the applying unit applies an accumulated average value of a plurality of corrected brightness values which is calculated by the calculating unit to the around view video.

2. The AVM apparatus of claim 1, wherein the plurality of cameras includes:
   a first camera which is mounted at a front side of the vehicle;
   a second camera which is mounted at a rear side of the vehicle;
   a third camera which is mounted at a left side of the vehicle; and
   a fourth camera which is mounted at a right side of the vehicle, and
   the plurality of videos includes:
   a first video received from the first camera;
   a second video received from the second camera;
   a third video received from the third camera; and
   a fourth video received from the fourth camera.

3. The AVM apparatus of claim 1, wherein the video composing unit composes the videos using a look-up table and outputs the composite video as an around view video.

4. The AVM apparatus of claim 1, wherein the calculating unit calculates the corrected value by the first calculating method or the second calculating method which is distinguished based on a shadow or an object other than the vehicle which is included in the around view video.

5. The AVM apparatus of claim 1, wherein the first calculating method calculates an arithmetic average value of the upper region and the lower region and subtracts the average brightness value of the upper region or the lower region from the arithmetic average value to calculate the corrected value when neither a shadow nor an object other than the vehicle is included in the around view video.

6. The AVM apparatus of claim 1, wherein the second calculating method divides each of the upper region and the lower region into a plurality of regions, calculates an arithmetic average value between divided regions which are symmetrical to each other with respect to the boundary line, and subtracts an average brightness value of the divided regions from the arithmetic average value to calculate the corrected value when a shadow or an object other than the vehicle is included over two or more videos among the plurality of videos.

7. The AVM apparatus of claim 1, wherein the accumulated average value is calculated in a state when ten corrected values are accumulated.

8. The AVM apparatus of claim 1, wherein the applying unit applies the corrected value which is calculated by the calculating unit to each of the first channel, the second channel, the third channel, and the fourth channel.

9. An around view monitoring (AVM) apparatus, comprising:
   a plurality of cameras which is mounted on a vehicle;
   a video composing unit which receives a plurality of videos from the plurality of cameras and composes the plurality of videos to generate an around view video;
   a brightness correcting unit which receives the around view video and corrects the brightness of the around view video based on an average brightness value and a variation of the brightness values for every region which is included in the around view video and outputs the around view video whose brightness is corrected; and
   a video display unit which displays the around view video whose brightness is corrected,
   wherein the brightness correcting unit includes:
   a measuring unit which measures an average brightness value and a variance of the brightness values of an upper region of a boundary and a lower region of the boundary obtained by composing the plurality of videos in the around view video;
   a calculating unit which calculates a corrected brightness value of the around view video by a first calculating method or a second calculating method, using the average brightness value and the variance of the brightness values; and an applying unit which applies the calculated corrected brightness value to the around view vide, wherein the calculating unit calculates one corrected value for every six frames in the around view video.

10. An operating method of an AVM apparatus, comprising:
   receiving a plurality of videos from a plurality of cameras which is mounted on a vehicle;
   generating an around view video by composing the plurality of videos;
   measuring an average brightness value and a variance of brightnesses for every region which is included in the around view video;
   calculating a corrected brightness value of the around view video based on the measured average brightness value and variance of the brightness values; and
   applying the corrected brightness value to the around view video,
   wherein the applying applies an accumulated average value of a plurality of corrected brightness values which is calculated in the calculating to the around view video.

11. The method of claim 10, wherein the plurality of cameras includes:
   a first camera which is mounted at a front side of the vehicle;
   a second camera which is mounted at a rear side of the vehicle;
   a third camera which is mounted at a left side of the vehicle; and
   a fourth camera which is mounted at a right side of the vehicle, and
   the plurality of videos includes:
   a first video received from the first camera;
   a second video received from the second camera;
   a third video received from the third camera; and
   a fourth video received from the fourth camera.

12. The method of claim 10, wherein the generating composes the videos using a look-up table and generates an around view video.

13. The method of claim 10, wherein the measuring unit measures an average brightness value and a variance of the brightness values of an upper region of a boundary and a lower region of the boundary obtained by composing the plurality of videos in the around view video.

14. The method of claim 13, wherein the calculating calculates the corrected value by a first calculating method or a second calculating method which is distinguished based on a shadow or an object other than the vehicle which is included in the around view video.

15. The method of claim 14, wherein the first calculating method calculates an arithmetic average value of the upper region and the lower region and subtracts the average brightness value of the upper region or the lower region from the arithmetic average value to calculate the corrected value when neither a shadow nor an object other than the vehicle is included in the around view video.

16. The method of claim 14, wherein
   the second calculating method divides each of the upper region and the lower region into a plurality of regions, calculates an arithmetic average value of divided regions which are symmetrical to each other with respect to the boundary line, and subtracts an average brightness value of the divided regions from the arithmetic average value to calculate the corrected value when a shadow or an object other than the vehicle is included over two or more videos among the plurality of videos.

17. The method of claim 10, wherein the accumulated average value is calculated in a state when ten corrected values are accumulated.

* * * * *